United States Patent Office 3,502,481
Patented Mar. 24, 1970

3,502,481
FOOD SPREAD
Jacob Arie Schaap, Dordrecht, and Lim Torenvliet, Vlaardingen, Netherlands, assignors to Lever Brothers Company, New York, N.Y., a corporation of Maine
No Drawing. Filed Apr. 28, 1967, Ser. No. 634,493
Claims priority, application Netherlands, May 3, 1966, 6605933
Int. Cl. A23c 19/02
U.S. Cl. 99—116                              7 Claims

ABSTRACT OF THE DISCLOSURE

Food product comprising milk protein curd and fat, wherein the milk protein curd is derived from milk which has been heated in the presence of a calcium salt at a temperature between 70° C. and 150° C.

---

The invention relates to a process for the preparation of food products comprising milk protein curd and fat, particularly food spreads such as cheese spread and the like.

In traditional cheese making, curd obtained by treating milk with acid and proteolytic enzymes is ripened by the action of selected microorganisms in order to develop texture and flavour. Ripened cheese may then be treated further so as to obtain processed cheese.

In British Patent No. 1,127,281, it is proposed to prepare cheese-like spreads from a mixture of melting salts, non-milk fat, flavouring materials and, if desired, other compounds, as well as unripened curd. By this method it was possible to obtain cheese-like products having a pronounced flavour without it being necessary to resort to the use of ripened curd.

It has now been found that an improved spread, for example a cheese-like spread, may be obtained by using the curd and other milk proteins obtained by heating milk to a high temperature in the presence of a non-toxic calcium salt. The calcium salt may be added before, during or after heating the milk to the desired temperature, provided that if the calcium salt is added to the milk after heating to that temperature, the milk should be at a temperature within the range hereinafter specified.

Accordingly, the invention relates to a process for the preparation of a food spread containing milk protein curd and fat, wherein the milk protein curd is prepared by curdling milk in the presence of a non-toxic calcium salt at a temperature from 70° C. to 150° C.

The milk protein curd so obtained may conveniently be separated from residual whey prior to further treatment to form a spread.

For the purposes of this specification, the combined coagulum of whey protein and curd is referred to as "milk protein curd" to distinguish it from the whey protein-deficient curd which forms the raw material of traditional cheese and processed cheese manufacture, as well as that of the cheese-like spread described in the aforementioned patent.

The milk from which the milk protein curd is subsequently derived may be in any convenient form. Particularly suitable is milk of a type selected from the group consisting of skim milk, whole milk, reconstituted skim milk and reconstituted whole milk.

Suitable non-toxic soluble calcium salts are calcium chloride, calcium lactate, calcium nitrate and calcium acetate. It is preferred to use calcium chloride in a quantity of 1 to 5 gm. per litre of the milk to be treated.

A particularly preferable temperature for treating the milk with the calcium salt in order to curdle the milk protein curd is from 80° C. to 90° C.

In order to achieve the desired texture and spreading qualities, it is necessary to ensure that the finished spread contains from 5 to 25% by weight of fat, from 5 to 20% by weight of protein and from 50 to 70% by weight of water.

The fat may be added to and mixed with the milk protein curd after separation of the residual whey, to supplement any residual fat derived from the milk itself. It is, however, preferable but not entirely necessary to ensure that at least a proportion of the fat is present in the milk when curdling with the calcium salt occurs, and the qualities of the the curd are further improved if the fat is first emulsified with the milk before curdling takes place.

A particularly suitable form of fat for use according to the present invention is a vegetable fat, for example groundnut oil.

The product obtained according to the present invention has a higher protein content than that prepared according to the method described in the aforementioned patent, since whey proteins, as well as curd (otherwise known as milk casein), are precipitated by the calcium salt.

Milk protein curd as prepared by calcium precipitation, may also be applied in the manufacture of traditional ripened cheese and processed cheese. More particularly, the milk protein curd obtained after separation of the whey may be heated with melting salts, including polyphosphates as are commercially available, in a manner according to procedures well known in the art of processed cheese manufacture.

In the preparation of processed cheese from the milk protein curd of the present invention, the milk protein curd may first be ripened, for example through the agency of starter organisms as used in traditional cheese manufacture, and then heated with melting salts according to known procedures. Alternatively, melting salts may first be added to the milk protein curd which is then allowed to ripen before subsequently heating to melt it and applying other treatments of a type appropriate for processed cheese production.

The invention may, however, be employed with particular advantage in the preparation of products prepared as described in the aforementioned patent. The improved products so obtained have a texture which is finer and altogether superior to that of the products described in that patent application.

The spreads prepared according to the present invention may be supplemented with flavouring materials as desired. Suitable flavouring substances are: cheese flavour, amino acids, butter flavour, tomato puree, lemon essence, paprika powder and cocoa powder. When amino acids are used, a convenient source is protein hydrolysate.

The invention will now be illustrated by the following examples, in which the percentages and parts are expressed on a weight basis.

EXAMPLE I 360 g. of melted hardened groundnut oil (slip melting point 30° C.) containing 0.1% of monoglyceride (HYMONO SF) and 0.2% of soybean lecithin were dispersed in 8 litres of skim milk at 50° C. The mixture was homogenised in a Gann homogeniser.

To the emulsion 100 ml. of a 20% calcium chloride solution were subsequently added and the resultant mixture was rapidly heated by means of a heat exchanger to a temperature of 85° C. After the whey had been separated from the curdled proteins, the remaining milk protein curd had a dry matter content of 40%.

100 parts of the milk protein curd thus obtained were mixed with 20 parts of tomato puree (dry matter content about 30%), 3 parts of JOHA–S 9 (polyphosphate) salt, 0.6 part of JOHA–S 4 (polyphosphate), 1.8 parts of sodium chloride and 0.24 part of potassium sorbate. The mixing was effected in a Küstner melting kettle and after mixing the mixture was heated to 80° C. with the aid of live steam. After cooling to room temperature an excellently spreadable product was obtained. The pH was 5.9, the water content 61.4%, the fat content 16.5% and the protein content 10.4%.

EXAMPLE 2

Milk protein curd was prepared as described in Example I, except that hardened groundnut oil was used to which 0.4% of Annatto had been added.

100 parts of the milk protein curd were mixed with 5 parts of saccharose, 0.3 part of lemon essence, 1.45 parts of JOHA–K (polyphosphate) salt, 1.45 parts of JOHA–S 4 (polyphosphate) salt, 2 parts of a 65% sodium lactate solution, 0.5 part of sodiom chloride and 0.2 part of potassium sorbate. Otherwise the spread was prepared as described in Example I. The product obtained had a refreshing lemon flavour, a good gloss and an excellent consistency. The pH was 5.65, the water content 59.6%, the fat content 17.3% and the protein content 12.4%.

EXAMPLE 3

Milk protein curd was prepared as described in Example I, except that 1.3% of Annatto extract was added to the hardened groundnut oil. 100 parts of this milk protein curd was mixed with 5 parts of paprika powder, 1.45 parts of JOHA–K (polyphosphate) salt, 1.45 parts of JOHA–S 4 (polyphosphate) salt, 1 part of sodium chloride and 0.2 part of potassium sorbate.

The spread thus obtained had a good consistency and a clearly pronounced paprika flavour. The pH was 5.5, the water content 59.0%, the fat content 18.8% and the protein content 12.4%.

EXAMPLE 4

100 parts of milk protein curd prepared as described in Example I were mixed with 7 parts of cocoa powder (fat content 22%), 14 parts of saccharose, 0.00001 part of vanilla, 1.25 parts of JOHA–K (polyphosphate) salt, 1.25 parts of JOHA–S 4 (polyphosphate) salt, 0.3 part sodium chloride, and 0.2 part of potassium sorbate. The spread thus obtained had a good chocolate flavour and an excellent consistency. The pH was 5.6, the water content 55.9%, the fat content 16.2%, the protein content 12.4%.

EXAMPLE 5

100 parts of milk protein curd prepared as described in Example 2 were mixed with 3 parts of JOHA–C (polyphosphate) salt, 1 part of JOHA–S 4 (polyphosphate) salt, 1 part of sodium chloride, 1 part of amino acids, 0.2 of potassium sorbate and 0.08 part of cheese flavour. The composition of the amino acid mixture was as follows: 25% leucine, 22% sodium glutamate, 17% valine, 11% lysine, 7% asparagine, 6% phenylalanine, 6% methionine, 4% arginine and 2% serine.

The spread thus obtained had a good cheese flavour, a good gloss and was excellently spreadable. The pH was 5.8, the water content 56.9%, the fat content 19.4% and the protein content 14.7%.

EXAMPLE 6

To skim milk 1.25 of a 20% calcium chloride solution were added and the mixture was rapidly heated to 85° C. in a heat exchanger. After the whey had been drained from the coagulum, the milk protein curd thus obtained had a dry matter content of 30%.

72 parts of this milk protein curd were mixed with 28 parts of margarine, 3 parts of JOHA–C (polyphosphate) salt, 1 part of sodium chloride, 0.2 part of potassium sorbate, 0.15 part of colouring oil and 0.05 part of a butter flavour composition dissolved in oil. The butter flavour composition (as disclosed in British Patent 1,068,712) used contained for each kg. of refined groundnut oil the following:

200 g. of lactone of delta-hydroxydodecanoic acid
40 g. of lactone of gamma-hydroxy butyric acid
100 g. of lactone of gamma-hydroxy octanoic acid
400 g. of lactone of epsilon-hydroxy dodecanoic acid
40 g. of butyric acid
20 g. of caproic acid
20 g. of caprylic acid
20 g. of capric acid
10 g. of diacetyl
80 g. of acetyl methyl carbinol
0.06 g. of cis-hepten-4-al.

The spread was obtained by melting and mixing as described in Example I and had a good, smooth consistency and proved to be spreadable over a wide temperature range. The pH was 5.5, the water content 56.0%, the fat content 21.8% and the protein content 14.0%.

EXAMPLE 7

The procedure of Example 6 was repeated except that a refined and plasticised fat was used in place of margarine, and a product similar to that described in Example 6 was obtained.

EXAMPLE 8

A milk protein curd was prepared as described in Example 1. Two parts of a culture as is used for the souring of milk in the manufacture of margarine, comprising *Streptococcus lactis, Streptococcus cremoris* and *Leuconostoc citrovorum*, and 0.2 part of a commercial rennet were added to this milk protein curd and the mixture was stirred. The mass obtained was pressed and kneaded in a complector as used for the manufacture of margarine (a complector contains a conveyor worm, which forces the mass through orifices of some orifice plates, between which the mass is cut by revolving knives). The kneaded mass was ripened for 6 weeks at 50° C. 3 parts polyphosphate-containing melting salt (JOHA–S 9) and one part of NaCl were then added. The resulting composition was melted in the way described in Example I.

The final product had a good consistency and a mild cheese taste. It contained 17.5% fat, 16.9% protein and 59.2% water; its pH was 5.6.

What is claimed is:
1. A process for the preparation of a food spread which comprises the steps of:
   (i) dissolving in milk a non-toxic water-soluble calcium salt selected from the group consisting of calcium chloride, calcium lactate, calcium nitrate, and calcium acetate in an amount sufficient to cause coagulation of said milk at a temperature of 80 to 90° C.,
   (ii) heating said milk with said dissolved salts to a temperature of from about 80° C. to about 90° C., whereby milk protein curd and whey are formed solely due to the presence of said calcium salt and said heating,
   (iii) separating said curd from said whey,
   (iv) adding melting salts to said curd to form a mixture,
   (v) blending in a fat during any stage of the process recited heretofore,
   (vi) melting said fat-containing mixture, and
   (vii) allowing said fat-containing mixture to cool, forming a food spread.
2. A process in accordance with claim 1, wherein said fat is blended with said milk prior to formation of said milk protein curd.
3. A process in accordance with claim 1, wherein said fat is blended with said separated milk protein curd.
4. A process in accordance with claim 1 comprising the additional step of ripening said curd prior to melting.
5. A process in accordance with claim 1 wherein said milk is heated to a temperature of from about 80° C. to about 90° C. prior to dissolving said calcium salt.

6. A process in accordance with claim 1 wherein said melting salt comprises a polyphosphate salt.

7. A food spread comprising milk protein curd, fat, and water, said spread prepared by the process of claim 1.

References Cited

UNITED STATES PATENTS

| | | | |
|---|---|---|---|
| 2,401,919 | 6/1946 | Ender | 99—20 X |
| 2,564,374 | 8/1951 | Roland | 99—116 |
| 3,172,767 | 3/1965 | Foster et al. | 99—116 |
| 3,397,995 | 8/1968 | Elenbogen | 99—116 |

FOREIGN PATENTS 738,151  10/1955  Great Britain.

A. LOUIS MONACELL, Primary Examiner

D. M. NAFF, Assistant Examiner

U.S. Cl. X.R.

99—115